Sept. 9, 1930. L. DANESI 1,775,388
TROLLEY HARP
Filed Aug. 8, 1928
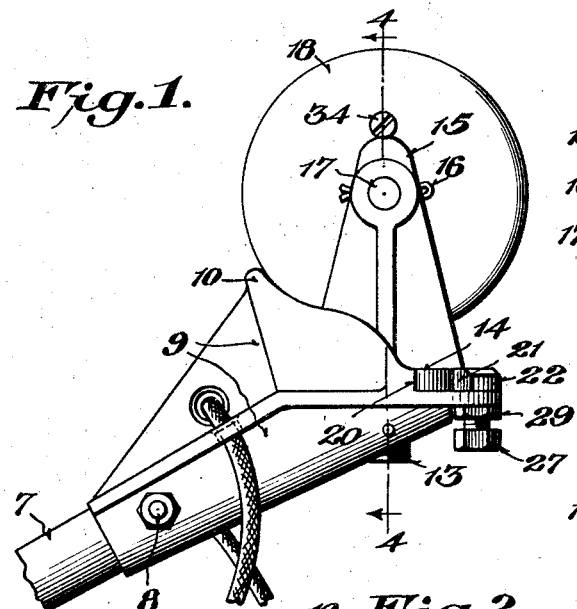
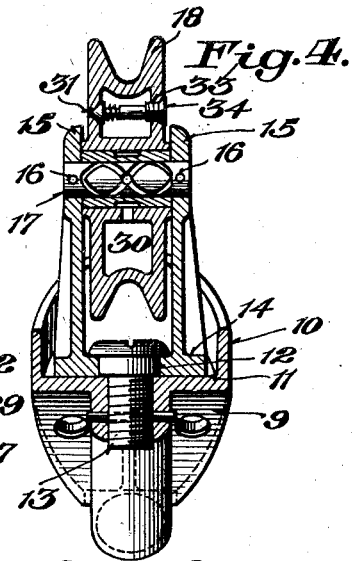
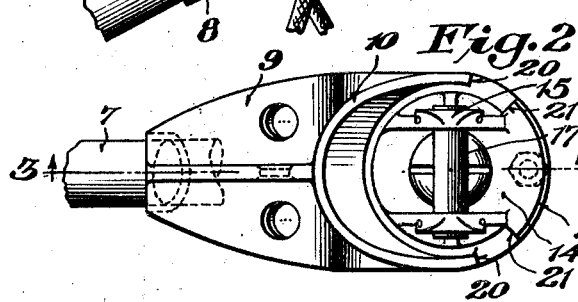
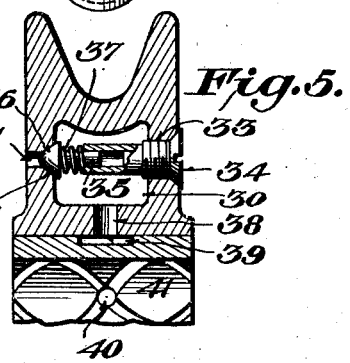
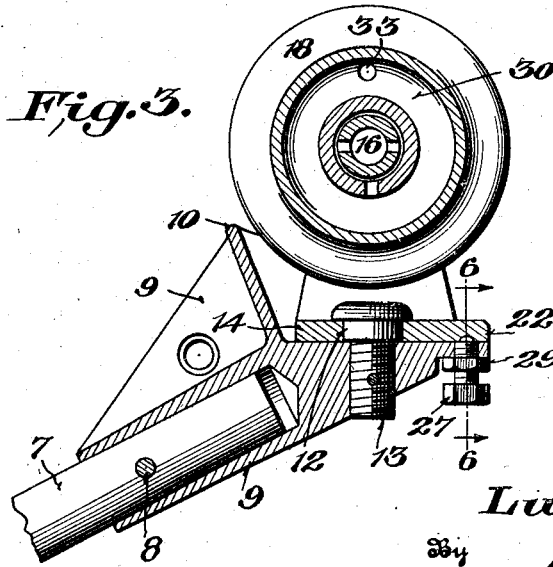
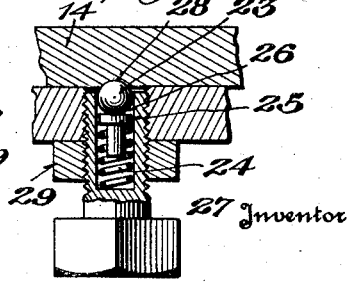
Inventor
Luigi Danesi,
Attorney Patented Sept. 9, 1930

1,775,388

UNITED STATES PATENT OFFICE

LUIGI DANESI, OF NEWTOWN, NEAR SYDNEY, NEW SOUTH WALES, AUSTRALIA, ASSIGNOR OF ONE-HALF TO HAROLD DHODAD ROBERTS, OF CUMBRAE, TORONTO, NEW SOUTH WALES, AUSTRALIA

TROLLEY HARP

Application filed August 8, 1928, Serial No. 298,159½, and in Australia August 8, 1927.

This invention refers to trolley harps.

The invention has been specially devised in order that the more or less destructive strain on the cable and on the pole and particularly on the trolley or sheave itself as the latter travels on the cable and especially around angular deviations or "curves" of said cable will be relieved, and this invention has been further devised to provide for the thorough lubrication of the trolley bearing.

In order that this invention may be readily carried into practice the same will now be more fully described with reference to the drawings accompanying and forming part of this complete specification, in which:

Fig. 1 is a side elevation of the harp; Fig. 2 a plan with the trolley removed; Fig. 3 a central sectional elevation; Fig. 4 is a central sectional view on line 4—4 in Fig. 1. Fig. 5 is an enlarged detail view of the lubricating means and Fig. 6 is a section on line 6—6 in Fig. 3.

The trolley pole 7 has a head base 9 fastened thereon by through bolt 8 and this base has a rear shroud 10 partly surrounding a facing 11. Upon the base 9 is rotatably mounted, on a collar portion 12 of shouldered and anchored screw 13 threaded into the base 9 a forked stanchion having a bearing base 14 and a pair of vertical arms 15. An axle 17 is mounted at its ends in the arms 15 and extends between the latter; being secured to said arms by suitable pins passing through alined openings 16 in the arms and the axle. Rotatably mounted on said axle, between the arms 15, is a trolley wheel 18. The shroud 10 flaring from facing 11 is part-circular with radial ends 20 forming stops. The circular bearing base 14 of the forked stanchion 14—15 has an outer sector 22 whose ends 21 are adapted on rotation to abut one or other of the stops 20. The forked stanchion 14—15 is held steady but rotatable by a resilient damper consisting of a ball 23 engaging the underface of the bearing base 14 and pressed thereagainst by a spring 24. This spring 24 is conveniently arranged in a hollow or recess 26 of a screw 27 threaded into the base 9 and provided with a lock nut 29 whereby the power of the spring may be adjusted and maintained, a follower 25 being provided between the spring and the ball, and the under face of the base 14 being grooved as indicated at 28 to provide a seat for the ball whereby the base 14 is maintained normally in a predetermined position of rotation relative to the base 9.

Apart from its ordinary construction the trolley wheel 18 has a cored annular cavity 30 in its body for lubricant and this cavity has an inlet or charging orifice with spring closure.

The charging orifice 31 has an internally tapered seating 32 in one side wall of the cavity 30 and juxtaposed thereto through the other side wall is a threaded orifice 33 through which is inserted a screw 34 recessed on its entry end to hold the stem 35 of a conical valve 36 adapted to tightly close on seating 32 there being a thrust spring 37 on said stem 35 between the end of the body of screw 34 and the head of valve 36. From the container 30 there are one or more channels 38 to oil carrying annular or circumferential groove 39 in wearing bush 41 and from this groove are a plurality of through ports 40 to the inner face of the said bush with oilway grooves in the said face.

The trolley pole head 9 tightly fits on the end of trolley pole 7 anchored there by bolt 8 supports the forked stanchion 14—15 which in turn carries the trolley wheel 18 which contacts the overhead electrically charged wire as ordinarily. Where this wire is straight and parallel with the track or way the trolley wheel 18 is aligned with the trolley pole 7, and the head base is retained in the position called for thereby by the ball 23 within its conforming indentation 28. When the overhead wire turns or deviates with or relative to the direction of the track play is required by the trolley head 9 so as to prevent friction and wear of the wheel 18 and as well to prevent the jumping of the wheel from the said wire and this is allowed for by the part-revolution of the bearing base 14 in its riding over the spring damper ball 23 as it moves between the stops 20. The cavity 30 of the trolley wheel is charged with fluid or partly fluid lubricant through the entry 31 which is then closed by screw 34 which presses valve 36 on to the seating 32 and so prevents leakage. In use the lubricant finds its way through channel 38 into annulus 39 and thence through ports 40 to the grooves 41 of the pulley liner or bush so insures plentiful lubrication between said liner and the axle 16.

What I claim as my invention and desire to secure by Letters Patent is:—

1. A trolley harp comprising a base, a trolley wheel support rotatably mounted on the base, a hollow screw member threaded into the base, and a spring housed within said screw member exerting upward pressure against the support.

2. A trolley harp comprising a base, a trolley wheel support rotatably mounted on the base, the under face of said support having a recess formed therein, a ball adapted for engagement in said recess, means holding said ball against lateral movement, and a spring constantly urging said ball upwardly against the under face of said support.

In testimony whereof I have signed my name to this specification.

LUIGI DANESI.